United States Patent [19]

Tsuji et al.

[11] Patent Number: 4,989,338
[45] Date of Patent: Feb. 5, 1991

[54] V-SHAPED GROOVE INSPECTING AND WORKING METHOD

[75] Inventors: Hiroyuki Tsuji; Susumu Nomoto, both of Nagoya; Takashi Ota, Kasugai, all of Japan

[73] Assignee: NGK Insulators, Ltd., Japan

[21] Appl. No.: 413,683

[22] Filed: Sep. 28, 1989

[30] Foreign Application Priority Data

Oct. 1, 1988 [JP] Japan .................. 63-248797

[51] Int. Cl.$^5$ .................. G01B 5/20; G01B 7/28
[52] U.S. Cl. .................. 33/554; 33/546; 33/833
[58] Field of Search .................. 33/546, 551, 553, 554, 33/555, 832, 836, 833

[56] References Cited

U.S. PATENT DOCUMENTS

| 3,481,043 | 12/1969 | Esch | 33/555 |
| 4,164,694 | 8/1979 | Amsbury et al. | 33/554 |
| 4,324,049 | 4/1982 | Blose | 33/551 |
| 4,337,580 | 7/1982 | Tanno et al. | 33/551 |

FOREIGN PATENT DOCUMENTS

| 2498106 | 7/1982 | France | 33/554 |
| 0010411 | 1/1982 | Japan | 33/551 |
| 0056701 | 4/1982 | Japan | 33/555 |
| 0071047 | 4/1983 | Japan | 33/546 |
| 0182502 | 8/1986 | Japan | 33/832 |
| 0244449 | 10/1986 | Japan | 33/551 |

Primary Examiner—Thomas B. Will
Attorney, Agent, or Firm—Parkhurst, Wendel & Rossi

[57] ABSTRACT

A method of inspecting V-shaped grooves carried out in the following steps. Coordinates of points more than 20 per groove on a substrate formed with V-shaped grooves are measured with a stylus moving in directions perpendicular to longitudinal directions of the grooves. Measured data within distances at least 10 μm from edges and groove bottoms of the grooves are removed from all data to find effective measuring segments. Shapes formed by straight lines are then calculated on the basis of the remaining data on effective measuring segments having a length of more than 40 μm. A method of working V-shaped grooves is effected in the following steps. A circle having a diameter substantially equal to that of fibers to be supported in the groove is so drawn that the circle is inscribed in an interior of a V-shaped groove calculated by the above method. The V-shaped groove of a substrate is then worked, while errors in center position of the circle are fed-back into the working process of the groove of the substrate to compensate for depths and pitches of the V-shaped grooves being worked.

1 Claim, 2 Drawing Sheets

FIG._1
PRIOR ART
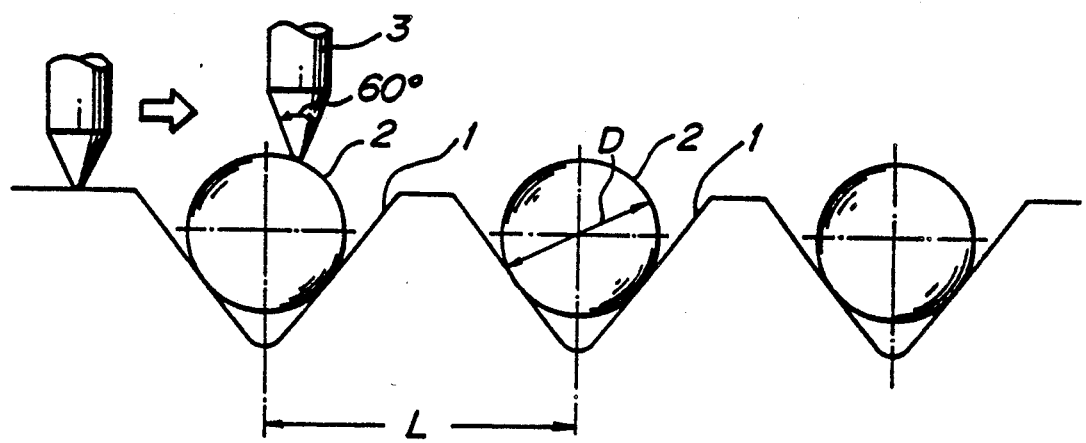
FIG._2
PRIOR ART
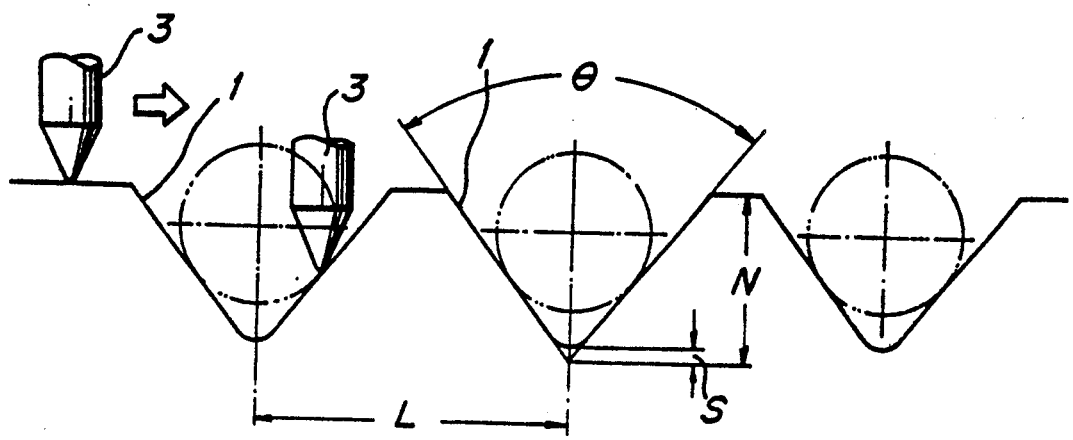

V-SHAPED GROOVE INSPECTING AND WORKING METHOD

BACKGROUND OF THE INVENTION

This invention relates to a method of inspecting and working V-shaped grooves, for example, those as formed in a substrate of an optical fiber connector with high accuracy of the order of submicrons.

In order to accurately connect optical fibers having a diameter of approximately 100 μm whose center axes are aligned with each other, connectors have been developed in which the optical fibers are embraced between a pair of chips formed in their surfaces with V-shaped grooves.

Such chips are made of a hard material such as ceramics, glass ceramics and quenched steel. The V-shaped grooves are formed by means of a rotating grinding wheel having a sharpened periphery edge. As any worked errors in the worked V-shaped grooves will directly cause deflections of axes or the optical fibers, the V-shaped grooves must be inspected to ensure high accuracy.

However, as the V-shaped grooves are on the order of 100 μm depth and 150 μm width, the measurement of surface roughness determined in ISO is not applicable to the inspection of the grooves. Even if a surface roughness tester is used, significant measured values can not be obtained.

In order to solve this problem, the following method has been proposed. In this method, as shown in FIG. 1, a master gauge 2 having a diameter equal to those of optical fibers to be used is arranged in a V-shaped groove 1 and a height of the master gauge 2 is measured by means of a stylus 3. A position and accuracy of the optical fiber in an actually used state are presumed with the aid of the measured value.

With this method, however, the accuracy is likely to be detrimentally affected by an unreliable master gauge, scores or scratches and locational conditions of the master gauge. Therefore, it is quite impossible to measure pitches of V-shaped grooves with an accuracy greater than 1.0 μm.

As shown in FIG. 2, moreover, a method has been proposed in which a V-shaped groove itself is directly measured with a stylus 3 to inspect whether a depth, width, pitch and the like are within allowable tolerances. In this method, however, errors occur due to chipping, breaking off, caulking and the like at edges of the V-shaped grooves. In addition, it is impossible with this method to accurately detect partial changes in angle θ of the V-shaped groove due to wear of tips of a grinding wheel.

SUMMARY OF THE INVENTION

It is an object of the invention to provide a method of inspecting shapes and dimensions of fine V-shaped grooves with a high accuracy of less than 1.0 μm and a method of working the V-shaped grooves utilizing results of the inspection in a manner eliminating all of the disadvantages of the prior art above described.

In order to accomplish the object, a method of inspecting V-shaped grooves according to the invention comprises the steps of measuring coordinates of more than 20 points per V-shaped groove on surfaces of a substrate formed with the V-shaped grooves by moving a stylus of a contacting type shape tester in directions perpendicular to a longitudinal direction of the V-shaped grooves, removing measured data obtained within distances at least 10 μm from each edge and the bottom of each of the V-shaped grooves from all data obtained in the previous step so as to obtain effective measuring segments between each edge and the bottom of each of the V-shaped grooves, and calculating shapes formed by straight lines on the basis of the remaining measured data using the effective measuring segments by using only those effective measuring segments which have a length of more than 40 μm.

In another aspect, a method of working V-shaped grooves according to the invention comprises the steps of drawing a circle having a diameter substantially equal to that of an element to be supported in the V-shaped groove so that the circle is inscribed in an interior of a V-shaped groove calculated by the inspecting method as set forth, and working the V-shaped groove of a substrate while feeding back errors in center position of the circle into the working process of the V-shaped groove of the substrate to compensate for depths and pitches of the V-shaped groove being worked.

The invention will be more fully understood by referring to the following detailed specification and claims taken in connection with the appended drawings.

BRIEF DESCRIPTION OF THE DRAWINGS

FIG. 1 is a front elevation for explaining an inspecting method of the prior art;

FIG. 2 is a front elevation for explaining another inspecting method of the prior art.

DESCRIPTION OF THE PREFERRED EMBODIMENTS

Figure 3:
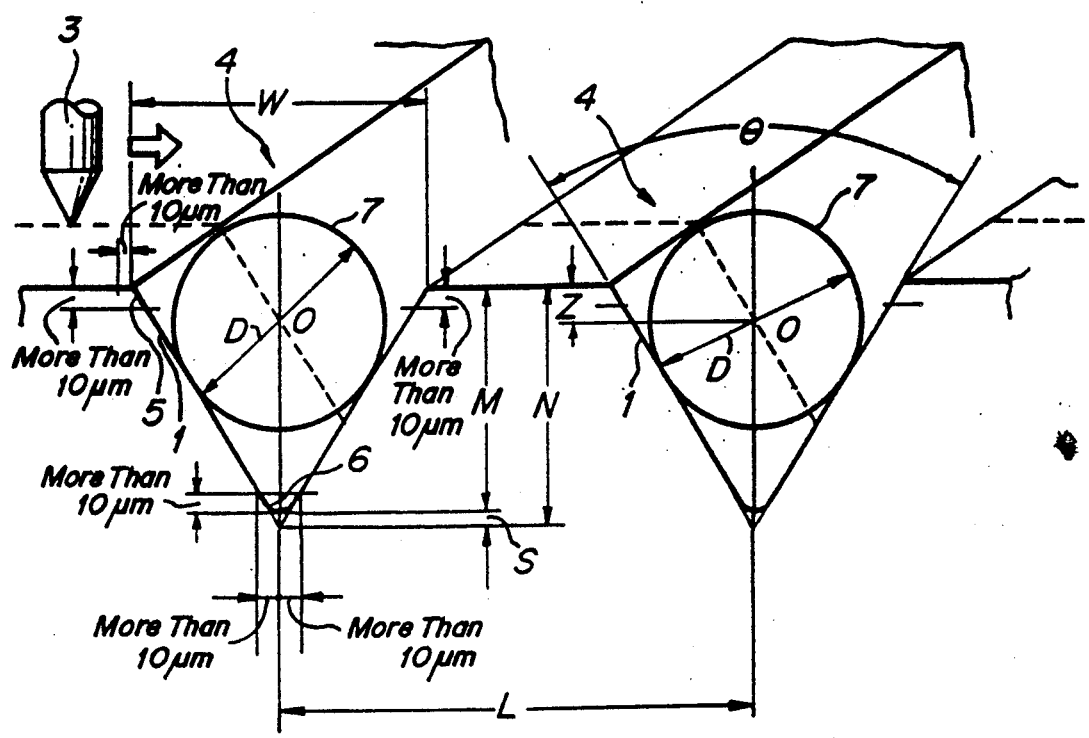
FIG. 3 is a perspective view for explaining the inspecting method according to the invention.

As shown in FIG. 3, according to the invention a stylus 3 is moved on surfaces 4 formed with V-shaped grooves 1 along the dotted lines in a direction perpendicular to a longitudinal direction of the V-shaped grooves 1 to measure coordinates for points on the surfaces 4 more than 20 per groove. The stylus 3 is preferably a contacting type shape tester such as Form Talysurf available from Rank Tailor Hobson Co.

A width (W) and a depth (M) of the V-shaped groove 1 are for example of the order of 150 μm and 100 μm, respectively. A pitch (L) of the V-shaped grooves 1 is on the order of 250 μm. An opening angle (θ) of the V-shaped groove 1 is more than 70°. Moreover, a stylus 3 having a tip end angle of 60° and a tip radius of 2 μm may be used.

The coordinates of more than 20 points are measured, while the tip end of the stylus moves on the broken lines. According to the invention, measured data within distances more than 10 μm at edges 5 and groove bottoms 6 of the grooves s as shown in FIG. 3 are removed from the data to provide effective measuring segments in order to avoid unstability in measured data. Remaining data of the effective measuring segments having a length of more than 40 μm are used to calculate shapes formed by straight lines with the aid of a calculating method such as the method of least squares or the like.

In the present invention, the reason why measured points per V-shaped groove are more than 20 is that errors in measurement may increase if the measured points are less than 20. Moreover, the measured data within the distances more than 10 μm from the edges and the bottom of the V-shaped grooves are excluded from all the measured data for the reason that the chipping, breaking off, caulking and the like are likely to occur within the portions in working and it is therefore difficult to cause the stylus 3 to follow along the lines exactly. Furthermore, only the measured data on the portions of the V-shaped grooves having the effective measuring segments having a length or more than 40 μm are used for the calculations since high accuracy can only be obtained from such data.

With the above inspecting method according to the invention, the V-shaped grooves can be inspected with an accuracy of the order of 0.2 μm.

The Working method according to the invention will be explained hereinafter.

In the working method, a circle 7 having a diameter D equal to those of bodies (optical fibers) to be supported in the V-shaped grooves is drawn so as to be inscribed in an interior of a V-shaped groove whose coordinates were obtained in the calculation above described. Thereafter, any shifting distance during working of a center 0 of the circle 7 from a set position of the center 0 is detected and a compensation thereof is then fed-back to a working process.

Only the position of the center 0 of the circle 7 is considered in this manner since it is most important that centers of optical fibers and the like are accurately set when they are arranged in the V-shaped grooves. In other words slight errors in shape of the grooves are acceptable so long as the centers of the optical fibers are accurately determined.

When the shifting of the center position is fed-back to the working process, a relative position between a rotating grinding wheel and a chip is determined according to the fed-back signals, and a depth Z from the surface of the tip to the center 0 of the circle 7 and a pitch L of the V-shaped grooves are thus compensated.

In this manner, according to the invention even changes in shape of the V-shaped grooves and the like caused by wear of the tip end of the rotating grinding wheels can be accurately detected. In a machine tool having a resolving power of 0.1 μm, V-shaped grooves can be worked with a high accuracy of 0.3-0.5 μm.

As can be seen from the above explanation, according to the invention it is possible to accurately inspect with accuracy on the order of submicrons, fine V-shaped grooves which would be impossible to be measured by usual surface roughness testers in view of measuring lengths and cut-off values, and it is also possible to work such grooves with the aid of results of the inspection. Therefore, the method according to the invention can inspect and work with high accuracy fine V-shaped grooves of connector substrates, jigs for welding optical fibers, and jigs for assembling various kinds of sensors, for example, to prove great effectiveness in presumption of optical transmission losses and improvement of positioning accuracy. Accordingly, the invention greatly contributes to development of the inspection and working methods industries by eliminating all the difficulties in the prior art.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of inspecting and working V-shaped grooves formed in a substrate, comprising the steps of:
    (a) measuring coordinates for more than 20 points per V-shaped groove on surfaces of the substrate by moving a stylus of a contacting type shape tester in directions perpendicular to a longitudinal direction of the V-shaped grooves;
    (b) removing measured data obtained within at least 10 μm from each edge and the bottom of each of the V-shaped grooved from all data obtained from the step (a) so as to obtain effective measuring segments between each edge and the bottom of each of the V-shaped grooves;
    (c) calculating shapes formed by straight lines on the basis of the remaining measured data using the effective measuring segments by using only those effective measuring segments which have a length of more than 40 μm;
    (d) drawing a circle having a diameter substantially equal to that of an element to be supported in the V-shaped groove such that the circle is inscribed in an interior of the V-shaped groove having coordinates calculated in the steps (a)–(c); and
    (e) working the V-shaped grooves while feeding back errors in center position of the circle into a working process to compensate for changes in depth and pitch of the V-shaped grooves being worked;
    wherein a relative position between a tool for working the V-shaped grooves and the substrate is determined by signals representing the fed-back errors in the center position of the circle into the working process.

* * * * *